(12) United States Patent  
Amano

(10) Patent No.: US 8,576,424 B2
(45) Date of Patent: Nov. 5, 2013

(54) PRINTING SYSTEM AND CONTROL METHOD

(75) Inventor: Maki Amano, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 366 days.

(21) Appl. No.: 13/033,628

(22) Filed: Feb. 24, 2011

(65) Prior Publication Data
US 2011/0211217 A1 Sep. 1, 2011

(30) Foreign Application Priority Data

Feb. 26, 2010 (JP) ................. 2010-041699

(51) Int. Cl.
G06K 15/00 (2006.01)
(52) U.S. Cl.
USPC ............ 358/1.14; 358/1.15; 714/5.1; 714/6.2
(58) Field of Classification Search
None
See application file for complete search history.

(56) References Cited

U.S. PATENT DOCUMENTS 5,023,631 A 6/1991 Negishi et al.
2007/0146457 A1 6/2007 Kito

FOREIGN PATENT DOCUMENTS

| JP | 2-131980 A | 5/1990 |
|---|---|---|
| JP | 3-284961 A | 12/1991 |
| JP | 9-305072 A | 11/1997 |
| JP | 9-314959 A | 12/1997 |
| JP | 3768974 B2 * | 4/2006 |
| JP | 2007-52078 A | 3/2007 |
| JP | 2007-175948 A | 7/2007 |

OTHER PUBLICATIONS

English Translation of JP 3768974 B2.*

* cited by examiner

Primary Examiner — Marivelisse Santiago Cordero
Assistant Examiner — Aaron R Gerger
(74) Attorney, Agent, or Firm — Nutter McClennen & Fish LLP; John J. Penny, V

(57) ABSTRACT

A printing system including plural devices can appropriately stop normally operating devices in a short time when a problem occurs in any one of the plural devices. The printing system has devices that execute processes for printing on printing paper, device control units that control the devices, and a central control unit that centrally controls the devices. When a problem is detected in one device, the central control unit sends, as a command for a process to be executed immediately, a stop device command for stopping the other device to the device control unit that controls the device in which a problem is not detected. The device control unit that receives the stop device command executes a process based on the stop device command with priority over processes based on other commands, and stops the device.

17 Claims, 2 Drawing Sheets

PRINTING SYSTEM AND CONTROL METHOD

This application claims priority under 35 U.S.C. §119 to Japanese Patent Application No. 2010-41699 filed on Feb. 26, 2010, the entire disclosure of which is expressly incorporated by reference herein.

BACKGROUND

1. Technical Field

The present invention relates to a printing system that has plural devices for printing on printing paper, and to a control method for the printing system.

2. Related Art

Japanese Unexamined Patent Appl. Pub. JP-A-2007-175948 teaches a photograph printer that has a reverse printing device that prints on the back side of the recording paper (the uncoated non-printing side), and an image recording unit that prints a photograph on the front side of the recording paper (the coated printing side). In the photograph printer taught in JP-A-2007-175948, the reverse printing device is a dot impact printer, and the image recording unit is an inkjet printer. The recording paper is supplied in this photograph printer from a loading unit in which recording paper that is wound into a roll is loaded, and the recording paper supplied from the loading unit is cut by a cutter. Text and photograph printing are performed after the recording paper is cut, and after printing is completed, the printed sheets are sorted by a sorter.

Printers that print on recording paper using a printhead are also known from the literature. Japanese Unexamined Patent Appl. Pub. JP-A-H09-314959, for example, teaches a printer that has a main control unit that controls printer operation, a head control unit that controls driving the printhead, and a carriage control unit that controls printhead movement. In the printer described in JP-A-H09-314959, the CPU of the main control unit, the CPU of the head control unit, and the CPU of the carriage control unit are communicably connected to each other. If any one of the three CPUs in this printer detects a printer problem, it reports the problem to the other CPUs, and the three CPUs each independently execute an appropriate error-handling process.

If a problem occurs in any one of the component devices of the photograph printer taught in JP-A-2007-175948, that is, the reverse printing device, the image recording unit, the loading unit, the cutter, or the sorter, and operation of the devices in which a problem has not occurred is not stopped, the devices in which a problem has not occurred could be damaged. For example, if a problem occurs in the loading unit and the reverse printing device continues operating even though the recording paper is not supplied, the platen disposed opposite the printhead of the reverse printing device could be damaged. As a result, when a problem occurs in one device, operation of the other devices in which a problem has not occurred is preferably stopped as quickly as possible.

If the plural devices are connected to a common power supply, the other devices in which a problem has not occurred can be stopped immediately by cutting off the common power supply. However, if the common power supply to which the plural devices are connected is cut off to immediately stop the other devices in which a problem has not occurred, there could be a device that cannot be stopped appropriately. As a result, if the common power supply is turned off to abruptly stop plural devices, one of the other devices in which a problem has not occurred could be damaged.

SUMMARY

When plural devices are connected to a common power supply and a problem occurs in any one of the devices, a printing system and a control method for a printing system according to at least of one embodiment of the invention can appropriately and quickly stop the devices in which a problem has not occurred.

A first aspect of the invention is a printing system having: a plurality of devices including a device that prints on printing paper; a plurality of device control units that respectively control the plural devices; and a central control unit that centrally controls the plural device control units. When the central control unit detects a problem in at least one of the plural devices, the central control unit sends a stop device command for stopping the devices in which a problem is not detected as a command to be processed immediately to the device control units that control the devices in which a problem is not detected, and the device control units that received the stop device command execute a process based on the stop device command with priority over processes based on other commands to stop the devices in which a problem is not detected.

When the central control unit in the printing system according to this aspect of the invention detects a problem in at least one of the plural devices, the central control unit sends a stop device command for stopping the devices in which a problem is not detected as a command to be processed immediately to the device control units that control the devices in which a problem is not detected, and the device control units that received the stop device command execute a process based on the stop device command with priority over processes based on other commands to stop the devices in which a problem is not detected.

In a printing system according to another aspect of the invention, the device control units include a temporary storage unit that temporarily stores commands received from the central control unit, and a receive buffer that stores the temporarily stored commands in the order received; and the device control units determine if the command stored in the temporary storage unit is the stop device command, and if the command is the stop device command execute a process based on the stop device command with priority to processes based on commands stored in the receive buffer.

Further preferably, the device control unit does not store the stop device command in the receive buffer when the command stored in the temporary storage unit is determined to be the stop device command.

Further preferably, the printing system according to another aspect of the invention has a common power supply unit that supplies power to the plural devices and the plural device control units, and the central control unit continues the power supply from the power supply unit even when a problem is detected in one of the plural devices.

This aspect of the invention enables using a method appropriate to each device to quickly stop each device in which a problem is not detected without turning off the power to the devices.

When plural devices are connected to a common power supply, this aspect of the invention therefore enables appropriately and quickly stopping devices in which a problem is not detected when a problem occurs in any one of the devices.

In a printing system according to another aspect of the invention, each device control unit preferably has a receive buffer for storing at least commands received from the central control unit, and receives the stop device command and executes a process based on the stop device command even when the size of the stop device command exceeds the capacity available in the receive buffer.

In this case, the device control unit does not store the received command in the receive buffer if the command is determined to be a stop device command, and immediately executes the corresponding process by an interrupt, for example. This configuration thus enables stopping a device even if there is little available storage capacity in the receive buffer. Devices in which an error has not occurred can therefore be reliably stopped when an error occurs in any other device.

In a printing system according to another aspect of the invention, the central control unit sends the stop device command even if the addressed device control unit is off-line or busy; and the device control unit receives the stop device command even if the device control unit is off-line or busy.

In this aspect of the invention the central control unit can send the stop device command and the device control unit can receive the stop device command even if the controlled device is off-line or busy because there is no paper or a cover is open, for example.

A printing system according to another aspect of the invention also has, for example, a printer as a device that prints on printing paper, and a printer control unit that controls the printer as a device control unit. The central control unit sends a stop device command for stopping the printer to the printer control unit when a problem is detected in a device other than the printer; and the printer control unit executes a process based on the stop device command with priority to processes based on other commands and stops the printer.

Yet further preferably, the printer control unit at least stops the printer motor and stops the printing operation of a printhead as a process based on the stop device command.

With this configuration the printer can be stopped quickly using a method appropriate to the printer instead of simply turning off the power supply of the printer or other mechanical device. As a result, when a printer and other device are connected to a common power supply, and a problem occurs in the other device, the printer can be stopped appropriately and quickly. For example, if the printer power is turned off while printing, impact may be applied to the parts driving the head carriage and gears, or the inkjet head may not stop at the capping position, possibly resulting in printer damage. By applying the stop device command, however, motor speed can be immediately reduced and operation stopped, the head can be moved to a safe location, and the printer can be stopped safely.

In according to another aspect of the invention, an image printer that prints images such as photographs on the front side, which is one side, of the printing paper, and a reverse printer that prints text on the reverse side, which is the other side, of the printing paper, as devices that print on the printing paper; and a reverse printing control unit that controls the reverse printer as a device control unit. When the central control unit detects a problem with the image printer, the central control unit sends the stop device command for stopping the reverse printer to the reverse printing control unit; and the reverse printing control unit executes a process based on the stop device command with priority to processes based on other commands, and stops the reverse printer.

With this configuration the reverse printer can be stopped quickly using a method appropriate to the reverse printer instead of simply turning off the power supply to the reverse printer. As a result, when a reverse printer and a photograph printer are connected to a common power supply, and a problem occurs in the photograph (image) printer, the reverse printer can be stopped appropriately and quickly.

In another aspect of the invention, the image printer is an inkjet printer; and the reverse printer is a dot impact printer.

A printing system according to another aspect of the invention preferably also has, as devices other than devices that print on the printing paper, at least a device that supplies the printing paper to a device that prints on the printing paper, a device that conveys the printing paper, a cutting device that cuts the printing paper, and a device that sorts the cut printing paper.

Another aspect of the invention is a control method for a printing system that has a plurality of devices including a device that prints on printing paper, the control method including: a stop device command transmission step in which when a central control unit that centrally controls device control units that respectively control the plural devices detects a problem in at least one of the plural devices, the central control unit sends a stop device command for stopping the devices in which a problem is not detected as a command to be processed immediately to the device control units that control the devices in which a problem is not detected; and a stop device step in which the device control units that received the stop device command execute a process based on the stop device command with priority over processes based on other commands to stop the devices in which a problem is not detected.

Because the device control units are configured to receive commands for processes to be executed immediately even when the controlled device is busy or off-line, the stop device command can also be received.

In the stop device command transmission step of the printing system control method according to this aspect of the invention, when the central control unit detects a problem in at least one of the plural devices, the central control unit sends a stop device command for stopping the devices in which a problem is not detected as a command to be processed immediately to the device control units that control the devices in which a problem is not detected. In the stop device step, the device control units that received a stop device command execute a process based on the stop device command with priority over processes based on other commands to stop the devices in which a problem is not detected.

This aspect of the invention enables using a method appropriate to each device to quickly stop each device in which a problem is not detected without turning off the power to the devices.

When plural devices are connected to a common power supply, the control method according to this aspect of the invention therefore enables appropriately and quickly stopping devices in which a problem is not detected when a problem occurs in any one of the devices.

In the stop device command transmission step of a printing system control method according to another aspect of the invention, the central control unit sends the stop device command even if the addressed device control unit is off-line or busy. In this aspect of the invention the central control unit can send the stop device command and the device control unit can receive the stop device command even if the addressed device control unit is off-line or busy because there is no paper or a cover is open, for example.

A printing system control method according to another aspect of the invention preferably also has a command receiving step in which the device control unit receives the stop device command, and in the command receiving step, the device control unit receives the stop device command even if the device control unit is off-line or busy.

With this aspect of the invention the central control unit can send the stop device command and the device control unit can receive the stop device command even if the corresponding controlled device is off-line or busy because there is no paper or a cover is open, for example.

A printing system control method according to another aspect of the invention preferably also has a command receiving step in which the device control unit receives a command including the stop device command. The command receiving step includes the device control units temporarily storing commands received from the central control unit in a temporary storage unit, and storing the temporarily stored commands in a receive buffer in the order received, and when temporarily storing the commands in the temporary storage unit, the device control units determine if the command is the stop device command, and if the command is the stop device command execute a process based on the stop device command with priority to processes based on commands stored in the receive buffer.

Further preferably, the device control unit does not store the stop device command in the receive buffer when the command stored in the temporary storage unit is determined to be the stop device command.

In another aspect of the invention, the printing system preferably includes a printer as a device that prints on printing paper, and the stop device step stops at least the printer motor and the printing operation of a printhead.

In another aspect of the invention, the printing system preferably has a common power supply unit that supplies power to the plural devices and the plural device control units, and in the stop device command transmission step continues the power supply from the power supply unit even when a problem is detected in one of the plural devices.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of at least of one embodiment of the present invention is described below with reference to the accompanying figures.
General Configuration of the Printing System FIG. 1 is a block diagram schematically describing a printing system 1 according to a first embodiment of the invention.

Figure 1:
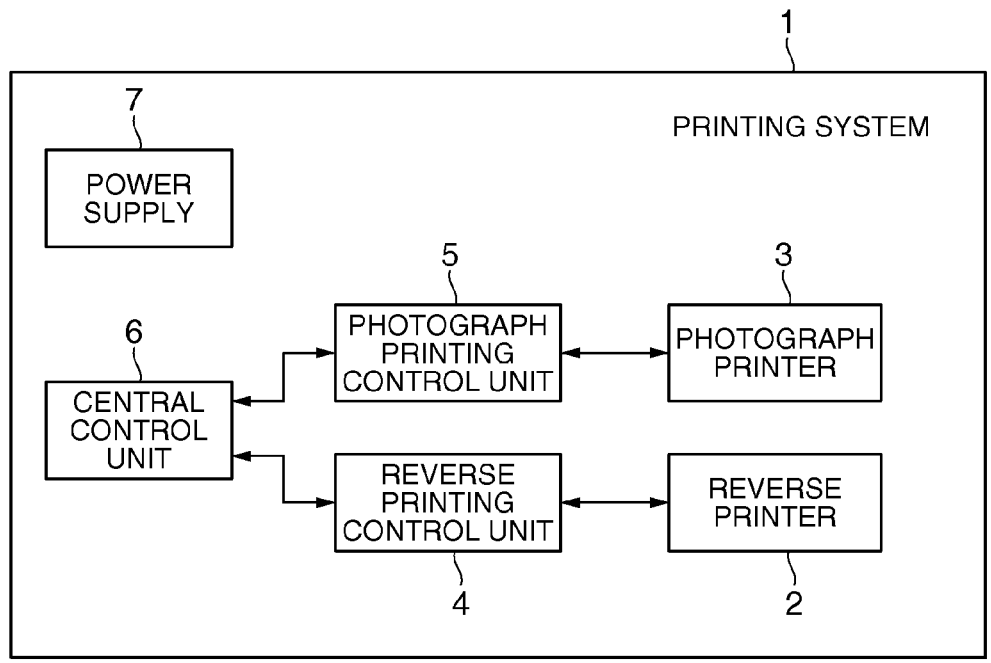
FIG. 1 is a block diagram schematically showing the configuration of a printing system according to a first embodiment of the invention.
Figure 2:
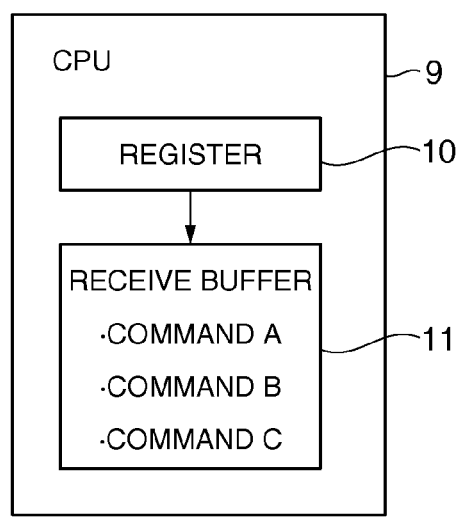
FIG. 2 is a block diagram describing part of the configuration of the CPU in the reverse printing control unit.

FIG. 2 is a block diagram describing part of the configuration of the CPU 9 in the reverse printing control unit 4 shown in FIG. 1.

Figure 3:
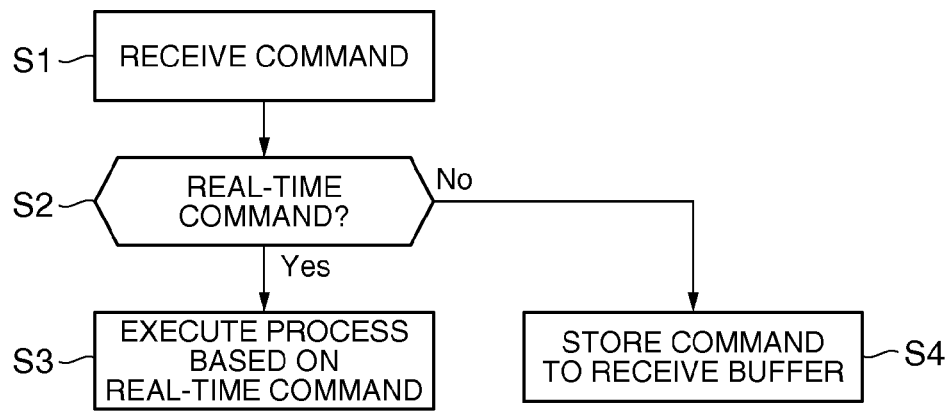
FIG. 3 is a flow chart of the command receiving process of the reverse printing control unit.

FIG. 3 is a flow chart showing the process executed when the reverse printing control unit 4 shown in FIG. 1 receives a command from the central control unit 6.

The printing system 1 according to this embodiment of the invention is a commercial printing system for printing images captured by a digital camera, for example. This printing system 1 includes plural devices for printing on printing paper, and plural device control units for controlling the plural printing devices. More specifically, the printing system 1 according to this embodiment of the invention as shown in FIG. 1 includes a reverse printer 2 as a printer for printing text on the reverse side of the printing paper (the uncoated side on which the photograph is not printed, also referred to herein as the non-printing side), and a photograph printer 3 for printing photographs or other images on the front side of the printing paper (the coated side, also referred to herein as the printing side). The printing system 1 also includes a reverse printing control unit 4 as the printer control unit for controlling the reverse printer 2, and a photograph printing control unit 5 that controls the photograph printer 3, as device control units.

In addition to a reverse printer 2 and photograph printer 3, the printing system 1 also has as devices for printing on printing paper a supply device that supplies the printing paper, a paper feed device for conveying the printing paper inside the system, a cutter for cutting the printing paper to a specific length, and a sorter for sorting the printing paper after printing is completed.

The printing system 1 also has a central control unit 6 for centrally controlling the plural devices, including the reverse printer 2 and the photograph printer 3. The central control unit 6 in this embodiment of the invention controls the entire printing system 1.

The printing system 1 also has a power supply 7 that supplies power to the plural devices, including the reverse printer 2 and the photograph printer 3. More specifically, power is supplied to the plural devices from a common power supply 7 in this embodiment of the invention. The power supply 7 also functions to supply power to the device control units, including the reverse printing control unit 4 and photograph printing control unit 5.

The reverse printer 2 is, for example, a dot impact printer including a printhead with a plurality of wire pins and an ink ribbon cartridge containing an ink ribbon. The printhead of the reverse printer 2 is fixed facing the paper feed path through which the printing paper is conveyed. Note that the printhead of the reverse printer 2 may alternatively be disposed movably relative to the paper feed path.

The photograph printer 3 is, for example, an inkjet printer including a printhead with a plurality of ink ejection nozzles, a head drive mechanism that drives the printhead, and a paper feed mechanism that conveys they printing paper.

The reverse printing control unit 4 is connected to the central control unit 6. The reverse printing control unit 4 includes a CPU 9 (see FIG. 2), ROM, and RAM.

The photograph printing control unit 5 is connected to the central control unit 6. The photograph printing control unit 5 also includes a CPU, ROM, and RAM.

The central control unit 6 sends commands for controlling the reverse printer 2 to the reverse printing control unit 4. The central control unit 6 also sends commands for controlling the photograph printer 3 to the photograph printing control unit 5.

As shown in FIG. 2, the CPU 9 that controls the reverse printing control unit 4 has a register 10 for temporarily storing commands (control commands) received from the central control unit 6. The register 10 stores the commands received from the central control unit 6 in the order received to a receive buffer 11. The CPU 9 normally executes processes based on the received commands in the order in which the commands were stored to the receive buffer 11, that is, first-in, first-out (FIFO). For example, if the register 10 receives commands A to C in that order from the central control unit 6, commands A to C are stored in the same order to the receive buffer 11, and the CPU 9 executes processes based on the commands in the same order A, B, and then C.

The central control unit 6 in this embodiment of the invention sends real-time commands (commands for processes to be executed immediately) that are to be executed with priority over other commands to the reverse printing control unit 4 regardless of the order of the commands stored in the receive buffer 11 of the CPU 9. For example, if the central control unit 6 detects a paper jam or other problem in the photograph printer 3 either through the photograph printing control unit 5 or directly from the photograph printer 3, the central control unit 6 sends a stop device command for stopping the reverse printer 2 to the reverse printing control unit 4 as a real-time command.

When the reverse printing control unit 4 receives a stop device command, it executes a process based on the stop device command with priority over processes based on any other commands that may be stored in the receive buffer 11 in order to stop the reverse printer 2. More specifically, if the reverse printing control unit 4 receives and temporarily stores a stop device command in the register 10, and determines that the command stored in the register 10 is a stop device command, the reverse printing control unit 4 invokes an interrupt process without storing the stop device command in the receive buffer 11, immediately executes the process based on the stop device command, and quickly stops the reverse printer 2. Even if the size of the stop device command exceeds the available capacity of the receive buffer 11, the reverse printing control unit 4 in this embodiment of the invention receives the stop device command and immediately executes a process based on the stop device command.

In addition, even if the central control unit 6 knows through an interface that the reverse printer 2 is off-line or is busy because a cover was opened, for example, the central control unit 6 sends the stop device command to the reverse printer 2 and the command is received by the reverse printing control unit 4.

The stop device command (real-time command) therefore continues to be sent and received even when data is normally not communicated so that prompt action can be taken as needed.

The reverse printing control unit 4 processes commands as shown in FIG. 3 when commands are received from the central control unit 6. More specifically, when a command is received from the central control unit 6 (step S1), the reverse printing control unit 4 determines if the received command is a stop device command (real-time command) (step S2). If in step S2 the received command is determined to be a real-time command, the reverse printing control unit 4 preferentially executes the process based on the received real-time command (step S3). If in step S2 the received command is determined to not be a real-time command, the reverse printing control unit 4 stores the received command in the receive buffer 11 (step S4).

Operation of the Printing System When a Problem Occurs

Figure 4:
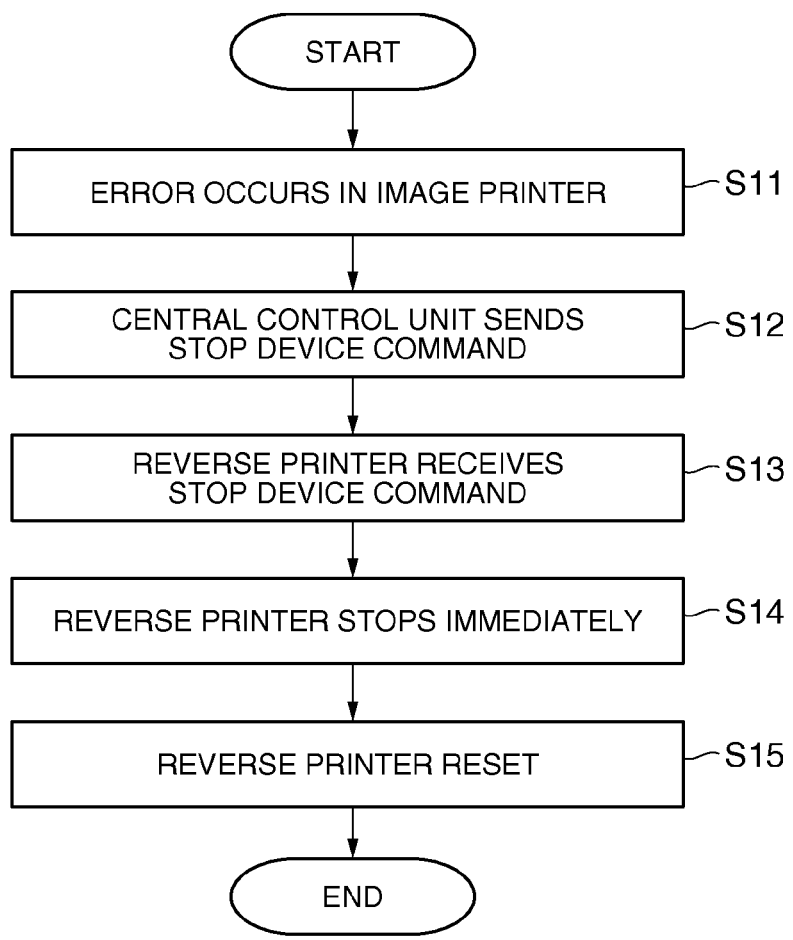
FIG. 4 is a flow chart showing an example of the operation when a problem occurs in the photograph printer.

FIG. 4 is a flow chart describing the operation of the printing system 1 when a problem occurs in the photograph printer 3 shown in FIG. 1.

When a problem occurs in the photograph printer 3, the printing system 1 described above operates as follows.

When a problem occurs in the photograph printer 3 (step S11), the central control unit 6 detects that there is a problem with the photograph printer 3 and sends a stop device command as a real-time command to the reverse printing control unit 4 (step S12).

The reverse printing control unit 4 receives the stop device command sent from the central control unit 6 (step S13), and immediately executes the process based on the stop device command with priority over processes based on commands stored in the receive buffer 11 to quickly stop the reverse printer 2 (step S14). The reverse printer 2 stops operating immediately even if the reverse printer 2 is in the middle of a printing operation in step S14. More specifically, the motor that feeds the ink ribbon stops and the wire pins stop operating immediately. The reverse printer 2 assumes a safe mode when the reverse printer 2 stops operating in step S14. The reverse printing control unit 4 then resets the reverse printer 2 (step S15).

Step S12 in this embodiment of the invention is a stop device command transmission step in which when a problem is detected in the photograph printer 3, which is one device, the central control unit 6 sends a stop device command for stopping the reverse printer 2 as a real-time command to the reverse printing control unit 4 that controls the reverse printer 2 in which a problem has not been detected.

Step S14 is a stop device step in which the reverse printing control unit 4 that received the stop device command executes a process based on the stop device command with priority over processes based on other commands to stop the reverse printer 2.

Step S13 is a command receiving step in which the reverse printing control unit 4 receives the stop device command.

Main Effect of at Least of One Embodiment of the Invention

As described above, when a problem is detected in the photograph printer 3 in this embodiment of the invention, the central control unit 6 sends a stop device command for stopping the reverse printer 2 to the reverse printing control unit 4 as a real-time command. The reverse printing control unit 4 that received the stop device command executes a process based on the stop device command with priority over processes based on other commands, and stops the reverse printer 2. As a result, the reverse printer 2 can be stopped in a short time using a method appropriate to the reverse printer 2 without turning the reverse printer 2 power off. The reverse printer 2 can therefore be appropriately stopped in a short time if a problem occurs in the photograph printer 3 even when a plurality of devices including a reverse printer 2 and photograph printer 3 are connected to a common power supply 7.

The reverse printing control unit 4 in this embodiment of the invention receives the stop device command and executes a process based on the stop device command even if the size of the stop device command exceeds the available capacity in the receive buffer 11. The reverse printer 2 can therefore be stopped immediately even if the remaining receive buffer 11 capacity is low. The reverse printer 2 can therefore be reliably stopped when a problem occurs in the photograph printer 3.

Other Embodiments

The central control unit 6 sends a stop device command for stopping the reverse printer 2 as a real-time command to the reverse printing control unit 4 when a problem is detected in the photograph printer 3 in the embodiment described above. However, when a problem is detected in any one of plural devices such as the reverse printer 2, photograph printer 3, paper supply device, paper feed device, cutter, or sorter, the central control unit 6 may send a stop device command for stopping the devices in which a problem is not detected as a real-time command to the device control units that control the devices in which a problem is not detected. In this case the device control units receiving the stop device commands execute processes based on the stop device command with priority over processes based on other commands, and stop the devices in which a problem has not been detected.

For example, if a problem occurs in a device other than the photograph printer 3, such as the paper supply device, paper feed device, cutter, or sorter, the central control unit 6 could send a stop device command to stop the reverse printer 2 as a real-time command to the reverse printing control unit 4.

In addition, if a problem occurs in the reverse printer 2, the paper supply device, paper feed device, cutter, or sorter, the central control unit 6 could send a stop device command to stop the photograph printer 3 as a real-time command to the photograph printing control unit 5. In this case, the photograph printing control unit 5 has a CPU 9 similarly to the reverse printing control unit 4, and when the photograph printing control unit 5 receives a stop device command executes a process based on the stop device command with priority over processes based on other commands to stop the photograph printer 3 even if commands are stored in the receive buffer 11.

Furthermore, when the central control unit 6 detects a problem in the reverse printer 2 or photograph printer 3, the central control unit 6 can send a stop device command for stopping other devices such as the paper supply device, paper feed device, cutter, or sorter as a real-time command to the device control units that control these other devices. In this case these device control units have a CPU 9, and the device control units receiving the stop device commands execute processes based on the stop device commands with priority over processes based on other commands to stop those devices even if commands are stored in the respective receive buffers 11.

In the embodiment described above the reverse printer 2 is a dot impact printer, but the reverse printer 2 could be an inkjet printer or other type of printer other than a dot impact printer. Furthermore, the photograph printer 3 in the foregoing embodiment is an inkjet printer, but the photograph printer 3 could be a laser printer or other type of printer other than an inkjet printer.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printing system comprising:
   a plurality of devices including a device that prints on printing paper;
   a plurality of device control units that respectively control the plurality of devices; and
   a central control unit that centrally controls the plurality of device control units;
   wherein when the central control unit detects a problem in at least one of the plurality of devices, the central control unit sends a stop device command for stopping devices in which a problem is not detected as a command to be processed immediately to device control units that control the devices in which a problem is not detected,
   the device control units that received the stop device command execute a process based on the stop device command with priority over processes based on other commands to stop the devices in which a problem is not detected,
   an image printer that prints images on a front side, which is one side of the printing paper, and a reverse printer that prints text on a reverse side, which is another side of the printing paper, as devices that print on the printing paper; and
   a reverse printing control unit that controls the reverse printer as a device control unit;
   wherein when the central control unit detects a problem with the image printer, the central control unit sends the stop device command for stopping the reverse printer to the reverse printing control unit; and
   the reverse printing control unit executes a process based on the stop device command with priority to processes based on other commands, and stops the reverse printer.

2. The printing system described in claim 1, wherein:
   the plurality of device control units include a temporary storage unit that temporarily stores commands received from the central control unit, and a receive buffer that stores the temporarily stored commands in the order received; and
   the device control units determine if one of the commands stored in the temporary storage units is the stop device command, and if the one of the commands is the stop device command, execute a process based on the stop device command with priority to processes based on commands stored in the receive buffer.

3. The printing system described in claim 2, wherein:
   the device control unit does not store the stop device command in the receive buffer when one of the commands stored in the temporary storage unit is determined to be the stop device command.

4. The printing system described in claim 1, wherein:
   each of the device control units has a receive buffer for storing at least commands received from the central control unit, and receives the stop device command and executes a process based on the stop device command even when a size of the stop device command exceeds a capacity available in the receive buffer.

5. The printing system described in claim 1, wherein:
   the central control unit sends the stop device command even if an addressed device control unit is off-line or busy; and
   each of the device control units are configured to receives the stop device command even if it is off-line or busy.

6. The printing system described in claim 1, comprising:
   a printer as a device that prints on printing paper; and
   a printer control unit that controls the printer as a device control unit;
   wherein the central control unit sends the stop device command for stopping the printer to the printer control unit when a problem is detected in a device other than the printer; and
   the printer control unit executes a process based on the stop device command with priority to processes based on other commands and stops the printer.

7. The printing system described in claim 6, wherein:
   the printer control unit at least stops a printer motor and stops a printing operation of a printhead as a process based on the stop device command.

8. The printing system described in claim 1, wherein:
   the image printer is an inkjet printer; and
   the reverse printer is a dot impact printer.

9. The printing system described in claim 1, comprising, devices other than devices that print on the printing paper, said devices other than devices that print on the printing paper comprising at least:
   a device that supplies the printing paper to a device that prints on the printing paper, a device that conveys the printing paper,
a cutting device that cuts the printing paper, and
a device that sorts the cut printing paper.

10. The printing system described in claim 1, further comprising:
a common power supply unit that supplies power to the plurality of devices and the plurality of device control units;
wherein the common power supply unit continues to supply the power from the power supply unit even when a problem is detected in one of the plurality of devices.

11. A control method for a printing system that has a plurality of devices including an image printer that prints images on a front side, which is one side of a printing paper, and a reverse printer that prints text on a reverse side, which is another side of the printing paper, the control method comprising:
a stop device command transmission step in which when a central control unit that centrally controls device control units that respectively control the plurality of devices detects a problem in at least one of the plurality of devices, the central control unit sends a stop device command for stopping devices in which a problem is not detected as a command to be processed immediately to device control units that control the devices in which a problem is not detected; and
a stop device step in which the device control units that received the stop device command execute a process based on the stop device command with priority over processes based on other commands to stop the devices in which a problem is not detected,
controlling the reverse printer as a device control unit;
wherein when the central control unit detects a problem with the image printer, the central control unit sends the stop device command for stopping the reverse printer to a reverse printing control unit; and
executing a process based on the stop device command with priority to processes based on other commands, and stopping the reverse printer.

12. The control method described in claim 11, wherein:
in the stop device command transmission step, the central control unit sends the stop device command even if an addressed device control unit is off-line or busy.

13. The control method described in claim 11, further comprising:
a command receiving step in which at least one of the device control units receives the stop device command, and
the at least one device control unit receives the stop device command in the command receiving step even if the at least one device control unit is off-line or busy.

14. The control method described in claim 11, further comprising:
a command receiving step in which the device control units receive commands including the stop device command; and
the command receiving step includes the device control units temporarily storing the commands received from the central control unit in a temporary storage unit, and storing the temporarily stored commands in a receive buffer in an order received, and
when temporarily storing the commands in the temporary storage unit, the device control units determine whether at least one of the commands is the stop device command, and if the at least one of the commands is the stop device command, execute a process based on the stop device command with priority to processes based on the commands stored in the receive buffer.

15. The control method described in claim 14, wherein:
the device control units do not store the stop device command in the receive buffer when a command stored in the temporary storage unit is determined to be the stop device command.

16. The control method described in claim 11, wherein:
the printing system includes a printer as a device that prints on the printing paper, and
in the stop device step stops at least a printer motor and a printing operation of a printhead.

17. The control method described in claim 11, wherein:
the printing system has a common power supply unit that supplies power to the plurality of devices and the plurality of device control units, and
in the stop device command transmission step continues the power supply from the power supply unit even when a problem is detected in one of the plurality of devices.

* * * * *